UNITED STATES PATENT OFFICE.

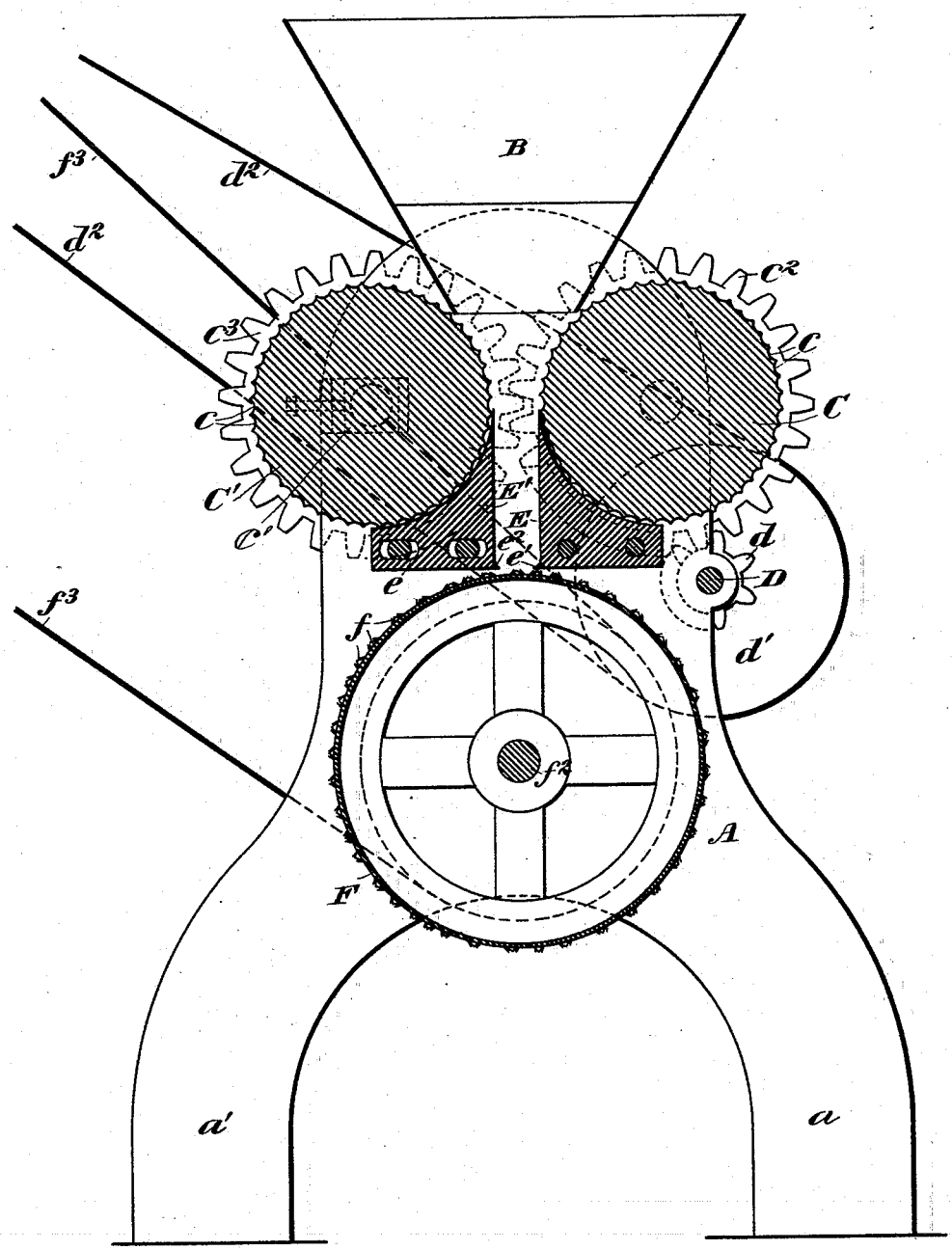

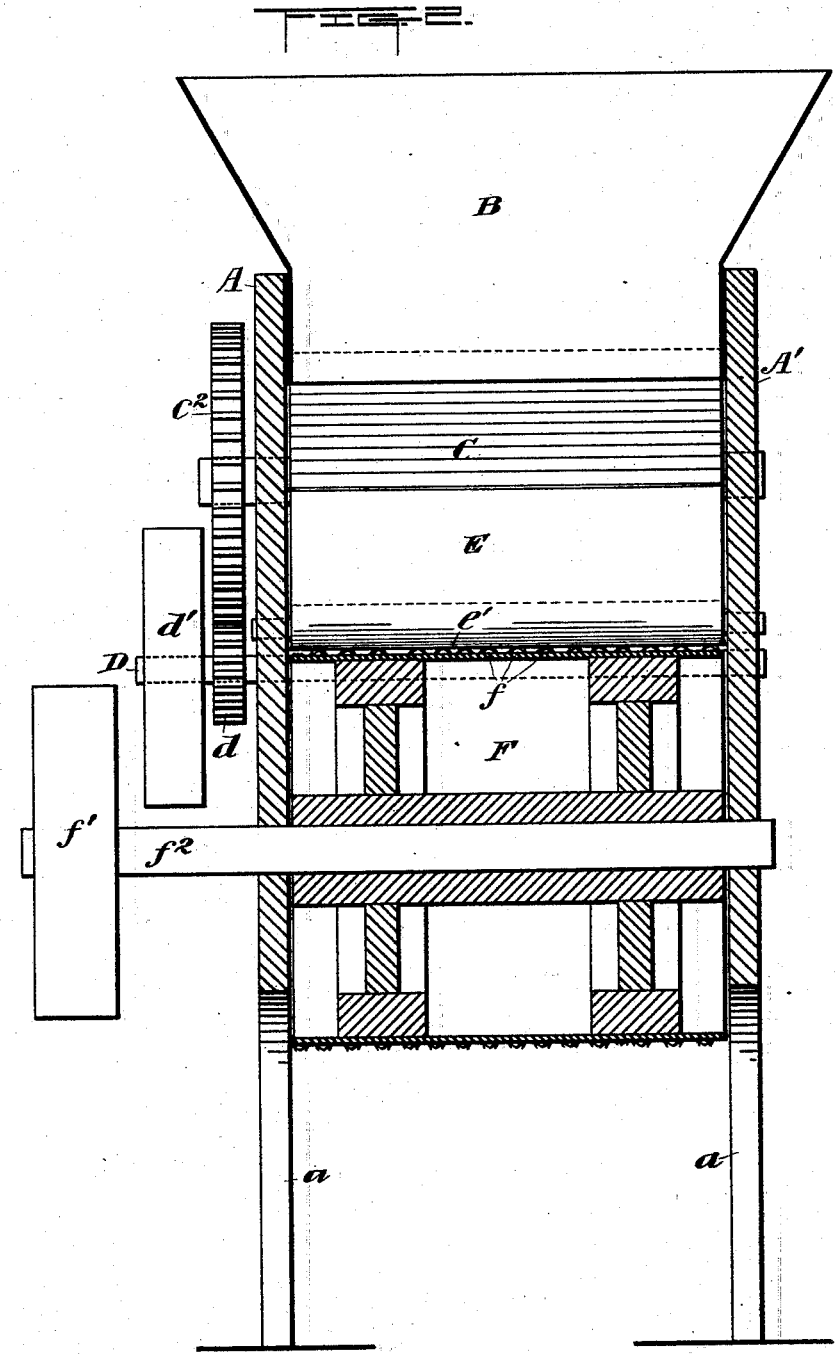

THEODORE A. WEBER, OF NEW YORK, N. Y.

GRANULATING-MILL.

SPECIFICATION forming part of Letters Patent No. 524,748, dated August 21, 1894.

Application filed November 20, 1893. Serial No. 491,390. (No model.)

*To all whom it may concern:*

Be it known that I, THEODORE A. WEBER, of New York, in the county and State of New York, have invented a new and useful Improvement in Granulating-Mills, of which the following is a specification.

My invention relates to an improvement in granulating mills and more particularly to mills for reducing to a granulated form substances which have more less of a yielding nature and which require to be caught and torn into fragments as distinguished from a crushing process.

My mill is especially adapted to granulating cork, which may be in pieces of varying size and compressed into a compact mass before its engagement with the disintegrating burrs.

A practical embodiment of my invention is represented in the accompanying drawings in which—

Figure 1 is a vertical section taken transversely through the feed rollers and hopper, and Fig. 2 is a central vertical section taken at right angles to the section in Fig. 1.

The supporting frame consists conveniently of a pair of end supports A, A', terminating at their base in legs $a$, $a'$. These end frames are suitably girded together so as to form a rigid support for the several operating parts to be hereinafter referred to.

The feed hopper B is located at the top of the mill and is arranged to discharge its contents between the faces of a pair of feed rollers C C'. The curved faces of the said feed rollers are preferably, though not essentially, corrugated, as shown at $c$, and it is intended that the discharge end of the feed hopper B shall continue down into proximity to the faces of the rollers C, C' so as to form a continuous passageway for the material to be granulated, down the sides of the hopper and along the faces of the rollers, the ends A and A' of the machine or downwardly projected ends of the hopper as may be found most expedient, forming a closure to prevent the material from escaping past the ends of the rollers C and C'. The rollers C and C' are journaled in suitable bearings attached to the end frames, the former C in fixed bearings and the latter C' in adjustable bearings $c'$ of any well known or approved form for the purpose of slightly increasing or diminishing the distance between the adjacent faces of the feeding rollers. The rollers C and C' have fixed to rotate therewith gear wheels $c^2$ and $c^3$ which intermesh with each other so as to drive the wheels in opposite directions, when power is applied to either one or the other of them. It is intended that the teeth on the wheels $c^2$ and $c^3$ shall be sufficiently long to permit the slight adjustment of the one roller with respect to the other without disengaging their intermeshing gear.

One of the gear wheels, in the present instance $c^2$, is driven by a pinion $d$ on a shaft D journaled in the frames A A', said shaft D having fixed thereon a band pulley $d'$ connected by a belt $d^2$ with a suitable source of power, not shown.

The material fed from the hopper between the adjacent faces of the feed rollers is received from and forced by the rollers into a charging chamber formed by a pair of cheek pieces E and E' which are secured between the end frames A and A' and having their upper edge in proximity to the curved feeding faces of the rollers C, C'. For the purpose of adjusting the width of the charging chamber, I make one of the cheek pieces E' for example, adjustable a short distance toward and away from the opposite piece E This may be accomplished by means of a slot and set screw connection, as shown at $e$. The ends of the charging chamber may be formed by the inner faces of the end pieces A, A', as herein shown, or it is obvious that the downwardly extended ends of the hopper or separate plates for the purpose might be inserted between the end frames A and A' to form the ends of said chamber. The lower end of the charging chamber is contracted by projecting the lower edges of the cheek pieces E and E' toward each other in a downwardly slanting direction, as shown at $e'$ and $e^2$. This feature of contracting the lower end of the charging chamber is a very important one as it has a tendency to retard the advance movement of the scraps or pieces of material to be granulated in their downward course under the action of the feeding rollers, causing them to become compressed into a compact mass within the charging chamber and to issue from the lower end thereof in such a compressed condition as to render the action of the disintegrating or granulating surface very effective.

The granulating of the mass is effected as it issues from the lower end of the chamber by the surface of a rotary drum or cylinder F provided on its periphery with manifold burrs $f$. The surface of the cylinder is preferably formed of tough and hard sheet steel and the burrs are preferably formed by punching holes in the sheet with a three-edges punch the three edges of the punch rotating from a common center so as to form three sharp pointed wings of metal, projecting outwardly from the outer surface of the cylinder. The cylinder F is mounted in suitable bearings in the frames A, A' with its burred surfaces in proximity to the discharge end of the charging chamber and is driven at a suitable rate of speed by means of a drive pulley $f'$, fixed on the shaft $f^2$ of the cylinder and connected by a band $f^3$ with a suitable source of power, not shown.

In operation the mass of material as it issues from the contracted end of the charging chamber is acted upon by the burrs on the surface of the rotating cylinder and is caught and torn into fragments by said burrs, the size of the fragments being easily regulated by the speed of the cylinder F, relative to the rate of feed.

What I claim is—

The combination with the feed rollers arranged to form between them a passage for the material to be granulated and a charging chamber forming a continuation of the passageway between the rollers beginning at the point where the faces of the rollers most nearly approach each other, said charging chamber being contracted at its discharge end, of a burred cylinder arranged to rotate in proximity to the contracted discharge end of the discharge chamber, substantially as set forth.

THEODORE A. WEBER.

Witnesses:
FREDK. HAYNES,
IRENE B. DECKER.